US012693169B2

(12) United States Patent
Takahashi

(10) Patent No.: US 12,693,169 B2
(45) Date of Patent: Jul. 28, 2026

(54) TEMPERATURE SENSOR AND HEATING COOKER

(71) Applicant: SHIBAURA ELECTRONICS CO., LTD., Saitama (JP)

(72) Inventor: Junya Takahashi, Semboku (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 390 days.

(21) Appl. No.: 18/271,187

(22) PCT Filed: May 25, 2022

(86) PCT No.: PCT/JP2022/021346
§ 371 (c)(1),
(2) Date: Jul. 6, 2023

(87) PCT Pub. No.: WO2023/228300
PCT Pub. Date: Nov. 30, 2023

(65) Prior Publication Data
US 2024/0385050 A1 Nov. 21, 2024

(51) Int. Cl.
*G01K 1/12* (2006.01)
*G01K 7/22* (2006.01)

(52) U.S. Cl.
CPC ................. *G01K 1/12* (2013.01); *G01K 7/22* (2013.01); *G01K 2207/00* (2013.01)

(58) Field of Classification Search
CPC ........ G01K 1/12; G01K 7/22; G01K 2207/00; G01K 1/08; A47J 37/0664
USPC .......................................................... 374/208
See application file for complete search history.

(56) References Cited

U.S. PATENT DOCUMENTS

| | | | | |
|---|---|---|---|---|
| 3,500,280 | A * | 3/1970 | Ensign | G01K 13/20 374/E13.002 |
| 6,752,531 | B2 | 6/2004 | McWilliams | |
| 7,410,294 | B2 | 8/2008 | Shiraki et al. | |
| 8,672,541 | B2 | 3/2014 | Ito et al. | |

(Continued)

FOREIGN PATENT DOCUMENTS

| | | | |
|---|---|---|---|
| CN | 1809733 | A | 7/2006 |
| CN | 102419219 | A | 4/2012 |

(Continued)

OTHER PUBLICATIONS

Office Action issued in Chinese Application No. 202280008486.6; Dated Mar. 9, 2024 (7 pages).

(Continued)

*Primary Examiner* — John E Breene
*Assistant Examiner* — Janice M Soto
(74) *Attorney, Agent, or Firm* — Osha Bergman Watanabe & Burton LLP

(57) ABSTRACT

A temperature sensor includes a protective tube made of metal, a sensor element including a thermosensitive body and a pair of conductive wires electrically connected to the thermosensitive body and accommodated in the protective tube, a first heat-resistant insulator for ensuring electrical insulation of the pair of conductive wires inside the protective tube, and a second heat-resistant insulator provided between the first heat-resistant insulator and the protective tube for ensuring electrical insulation between the conductive wires and the protective tube.

10 Claims, 9 Drawing Sheets

(56) References Cited

U.S. PATENT DOCUMENTS

| | | | | |
|---|---|---|---|---|
| 2004/0218662 A1* | 11/2004 | Hanzawa | G01K 13/02 374/185 |
| 2012/0063488 A1* | 3/2012 | Nakayama | G01K 1/10 374/185 |
| 2015/0168232 A1* | 6/2015 | Chu | G01K 1/12 374/208 |
| 2016/0202128 A1 | 7/2016 | Kato | |
| 2021/0041302 A1 | 2/2021 | Spring | |

FOREIGN PATENT DOCUMENTS

| | | | | |
|---|---|---|---|---|
| CN | 102435330 A | 5/2012 | | |
| CN | 105784162 A | 7/2016 | | |
| CN | 109041578 A | 12/2018 | | |
| CN | 208635938 U | 3/2019 | | |
| CN | 111918745 A | 11/2020 | | |
| CN | 111615622 B * | 4/2021 | G01K 1/08 | |
| EP | 3842775 A1 | 6/2021 | | |
| JP | H03-055538 U | 5/1991 | | |
| JP | H06-030740 U | 4/1994 | | |
| JP | 2004225921 A | 8/2004 | | |
| JP | 2010-261860 A | 11/2010 | | |
| KR | 101004404 B1 | 12/2010 | | |

OTHER PUBLICATIONS

Office Action issued in Japanese Application No. 2022-565748; Dated Jan. 20, 2023 (4 pages).

International Search Report issued in corresponding International Application No. PCT/JP2022/021346 mailed Aug. 9, 2022 (3 pages).

Office Action issued in counterpart German Patent Application No. 11 2022 000 379.0 mailed Dec. 18, 2025 (8 pages).

* cited by examiner

TEMPERATURE SENSOR AND HEATING COOKER

TECHNICAL FIELD

The present invention relates to a temperature sensor including a temperature sensing body of which electrical resistance changes with temperature, and a heating cooker equipped with the temperature sensor.

BACKGROUND ART

As an example, a temperature sensor using a temperature sensing body of which resistance value changes with temperature, such as a thermistor, is widely used to measure temperature in a water heater, a boiler, a heating cooker such as a convection microwave oven, and a stove. A temperature sensor element used for the temperature sensor includes a temperature sensing body including a pair of electrodes, a pair of lead wires electrically connected to the temperature sensing body via the electrodes, and a covering body typically made of heat-resistant glass that seals the temperature sensing body. In this kind of temperature sensor, in order to protect the sensor element from vibration, external force, combustion gas, or the like, the sensor element is accommodated in a highly airtight protective tube made of metal, as disclosed in Patent Literature 1 and Patent Literature 2.

The temperature sensors utilize bare wires (core wires) as lead wires, which are exposed without an electrical insulating resin covering. This is because the heat resistance of the insulating covering is considered. Therefore, in a temperature sensor in which a sensor element is accommodated in a protective tube made of metal, it is necessary to provide electrical insulation between a pair of lead wires and between the lead wires and the protective tube made of metal. For example, Patent Literature 2 realizes two electrical insulations by providing a fine ceramic lead wire accommodation tube through which a pair of lead wires are inserted and accommodated. As fine ceramics, aluminum oxide ($Al_2O_3$), silicon nitride ($Si_3N_4$), and the like are applied.

CITATION LIST

Patent Literature

Patent Literature 1: JP 2004-225921 A

Patent Literature 2: JP 2010-261860 A

SUMMARY OF INVENTION

Technical Problem

A temperature sensor is demanded to have heat resistance to be used in a harsh usage environment, for example, in a temperature range of 500° C., and to be capable of withstanding voltage, for example, exceeding 1000V.

An object of the present invention is to provide a temperature sensor that accommodates a sensor element inside a protective tube made of metal and a heating cooker equipped with this sensor, which can meet the demands.

Further, in recent years there has been a demand for an oven with a larger heating chamber. In order to measure the temperature in the heating chamber of the oven more accurately, it is preferable to measure temperature as close to the center of the heating chamber as possible. However, it has not been possible in the prior art to provide a temperature sensor with sufficient length to measure temperatures near the center of the heating chamber.

Solution to Problem

A temperature sensor of the present invention includes a protective tube made of metal, a sensor element including a thermosensitive body and a pair of wires electrically connected to the thermosensitive body and accommodated in the protective tube, a first heat-resistant insulator for ensuring electrical insulation of the pair of conductive wires that is exposed inside the protective tube, and a second heat-resistant insulator provided between the first heat-resistant insulator and the protective tube for ensuring electrical insulation between the conductive wires and the protective tube.

In the temperature sensor according to the present invention, the second heat-resistant insulator preferably comprises a cylindrical ceramic member.

In the temperature sensor according to the present invention, the second heat-resistant insulator preferably comprises a cylindrical glass member.

In the temperature sensor according to the present invention, each of the pair of conductive wires is preferably independently inserted through the first heat-resistant insulator.

In the temperature sensor according to the present invention, only one of the pair of conductive wires is preferably inserted through the first heat-resistant insulator.

In the temperature sensor according to the present invention, the temperature sensor further comprises a pair of cylindrical insulators preferably comprising an electrically insulating material for ensuring electrical insulation between the pair of conductive wires. The pair of conductive wires is inserted through the first heat-resistant insulator in a first area which is area on a side of an end portion of the protective tube having the end portion which is closed at a front, and is respectively inserted through the pair of cylindrical insulators in a second area at a rear of the first area.

In the temperature sensor according to the present invention, the second heat-resistant insulator preferably straddles the cylindrical insulators covering the pair of conductive wires on a rear (B) side.

In the temperature sensor according to the present invention, the conductive wire is preferably mechanically fixed to the protective tube by crimping through a crimping protective covering in an area of the conductive wire where the cylindrical insulator is provided.

In the temperature sensor according to the present invention, the protective tube preferably further includes a flange that extends in a direction intersecting a length direction of the protective tube, and a length the second heat-resistant insulator in the length direction is set equal to or less than a length from the bottom portion of the protective tube to a position where the flange is provided.

In the temperature sensor according to the present invention, the conductive wire is preferably mechanically fixed to the protective tube by crimping through a crimping protective covering in an area of the conductive wire where the cylindrical insulator is provided, and the crimping is preferably applied at a rear of the position where the flange of the protective tube is provided.

In the temperature sensor according to the present invention, an outer surface of the protective tube is preferably black.

The present invention also provides a heating cooker in which the above-described temperature sensor is arranged in a heating chamber.

Advantageous Effects of Invention

According to the temperature sensor of the present invention, by providing the first heat-resistant insulator to electrically insulate the conductive wires from each other and additionally providing the second heat-resistant insulator, reliable electrical insulation can be achieved even under usage environments that demand a notably high voltage withstand between the conductive wires and the protective tube.

DESCRIPTION OF EMBODIMENT

A first embodiment and a second embodiment of a temperature sensor of the present invention will be described below. All the embodiments are common in that the temperature sensor includes a first heat-resistant insulator for electrically insulating a pair of lead wires from each other and a second heat-resistant insulator that shields a current path between the pair of lead wires and a protective tube made of metal. The two embodiments are different in materials and aspects of configuring the first heat-resistant insulator and the second heat-resistant insulator.

The temperature sensor according to the present embodiment is suitable for applications requiring heat resistance of, for example, 500° C., and voltage resistance exceeding, for example, 1000 V.

First Embodiment: FIGS. 1, 2, 3, and 4

A temperature sensor 1 according to an embodiment of the present invention will be described with reference to FIGS. 1 to 4.

Figure 1:
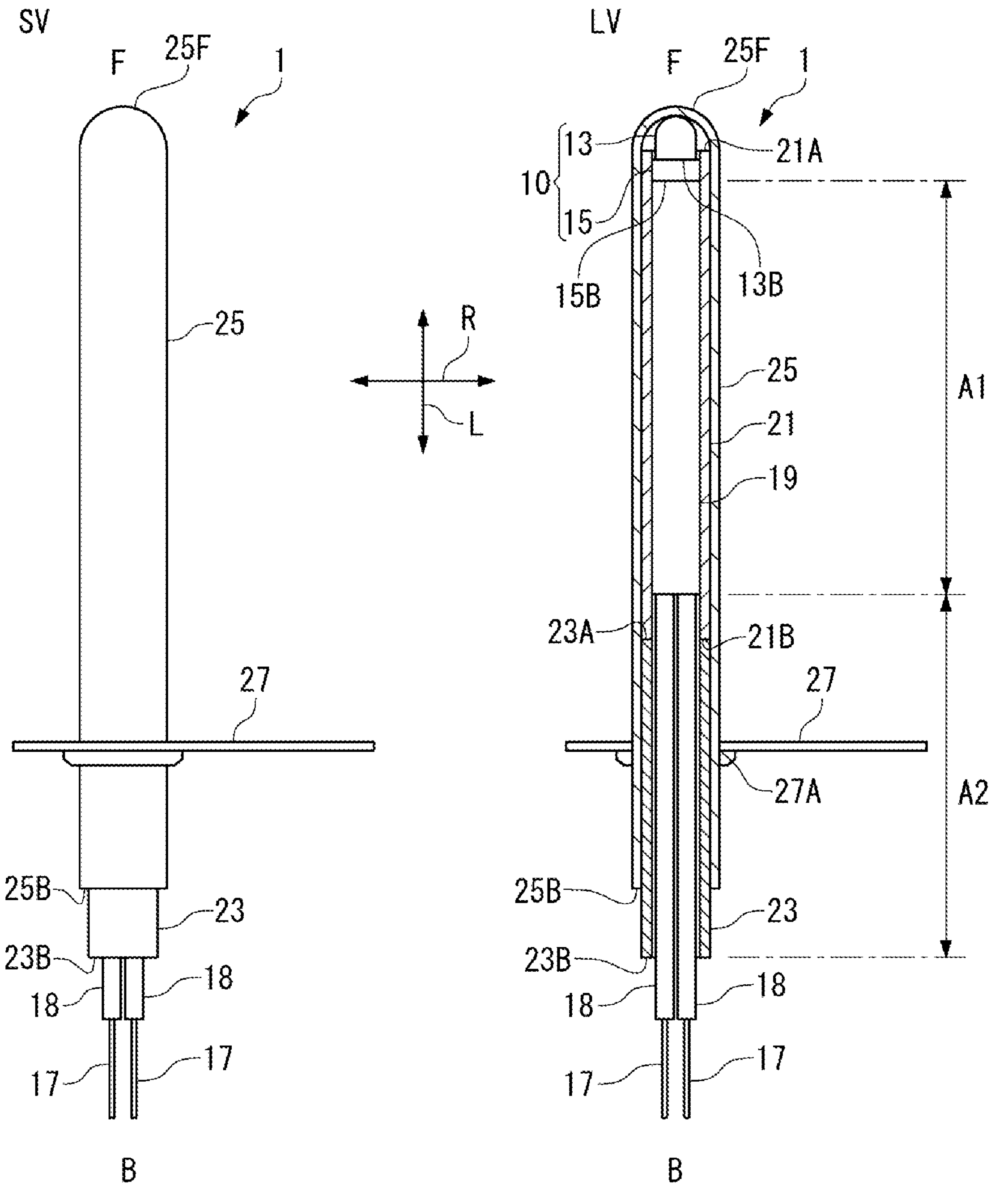
FIG. 1 is a side view (SV) and a longitudinal cross-sectional view (LV) illustrating a temperature sensor according to a first embodiment of the present invention.

As illustrated in FIG. 1, the temperature sensor 1 includes a sensor element 10 and a protective tube 25 made of metal that accommodates the sensor element 10. Various elements are provided between the sensor element 10 and the protective tube 25 to achieve electrical insulation in the temperature sensor 1.

In the temperature sensor 1, for convenience of description, a side on which a thermosensitive body 11 is provided is defined as a front (F), and the opposite side is defined as a rear (B). The definitions of the front and rear have relative meanings. Also, in the temperature sensor 1, an axial direction (L) and a radial direction (R) are defined. This definition is used for convenience of description of the present embodiment and does not specify the present invention.

Figure 3:
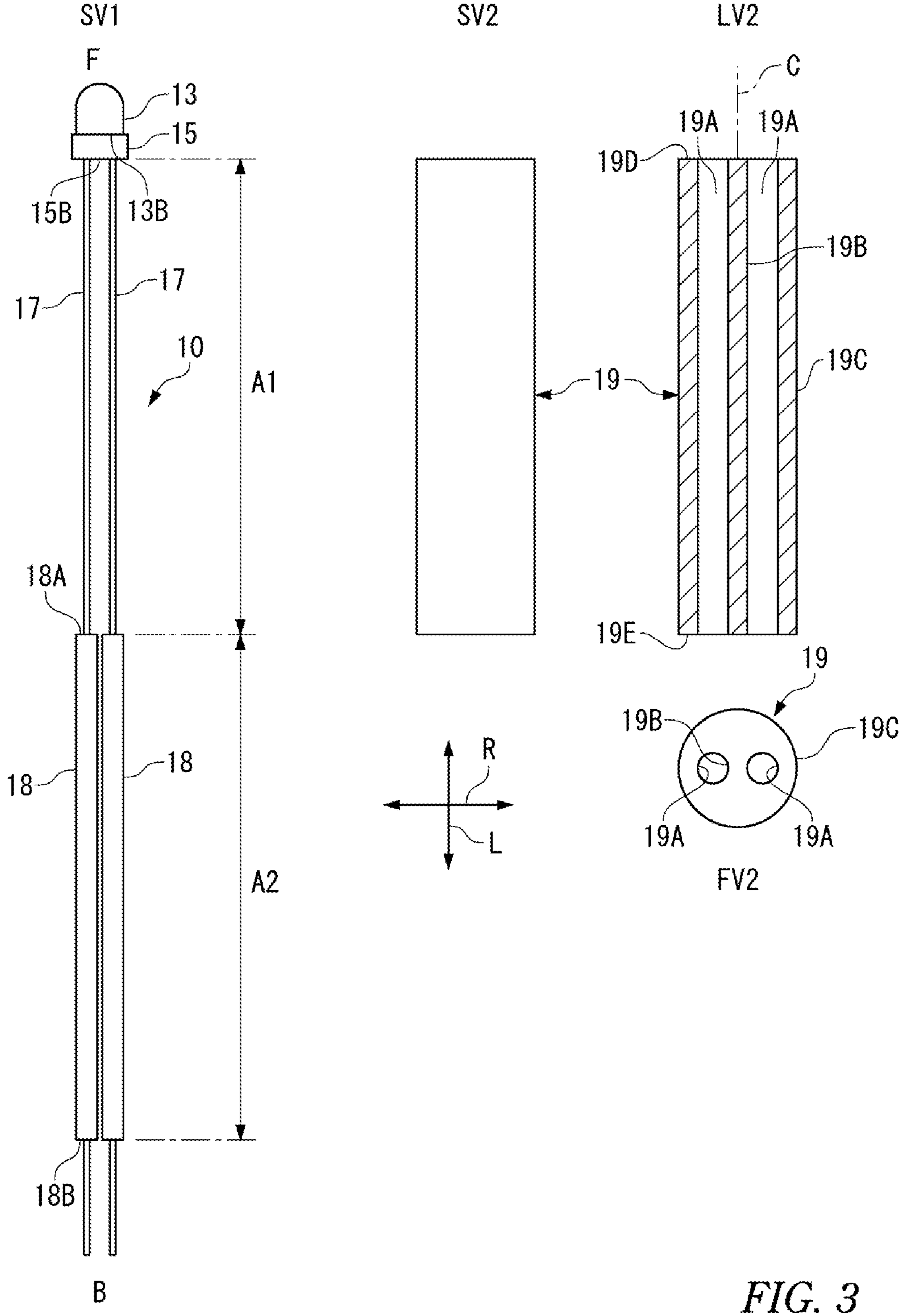
FIG. 3 is a side view (SV1) illustrating a sensor element of the temperature sensor of FIG. 1, a side view (SV2), a longitudinal cross-sectional view (LV2), and a front view (FV2) each illustrating a first heat resistant covering.
Figure 4:
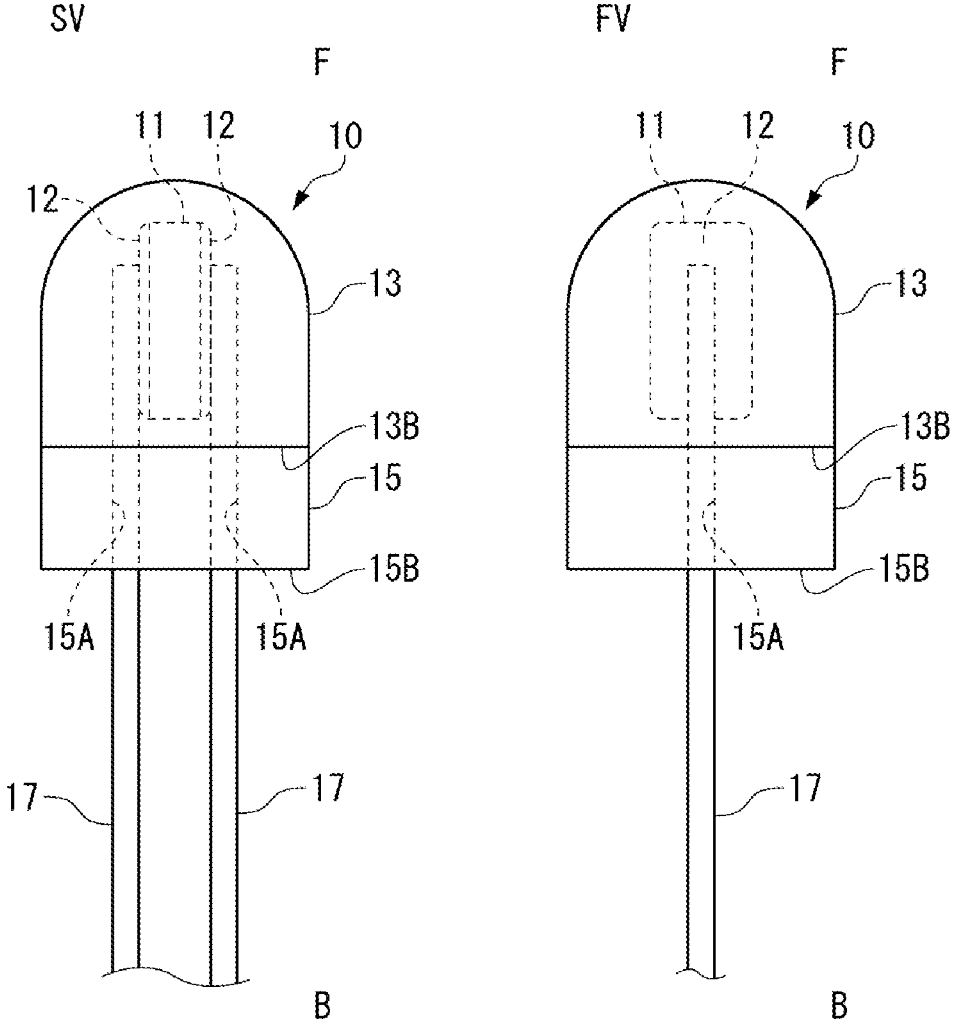
FIG. 4 is a side view (SV) and a front view (FV) each illustrating a thermosensitive body of the sensor element of FIG. 1 and its surroundings.

[Sensor Element 10: FIGS. 1, 3, and 4]

The sensor element 10 will be described with reference to FIGS. 1, 3, and 4.

As illustrated in FIG. 4, the sensor element 10 includes the thermosensitive body 11 having a rectangular parallelepiped shape, electrodes 12 and 12 respectively provided on two opposite surfaces of the thermosensitive body 11, a covering body 13 made of glass that covers a periphery of the thermosensitive body 11, a support tube 15 joined to a rear (B) end portion 13B of the covering body 13, and a pair of conductive wires 17 and 17 electrically connected to the thermosensitive body 11 through the electrodes 12 and 12.

[Thermosensitive Body 11: FIG. 4]

A thermistor, for example, is applied as the thermosensitive body 11. A thermistor is an abbreviation for a thermally sensitive resistor, and is a metal oxide that measures temperature by utilizing a change in electrical resistance with temperature.

Thermistors are classified into negative temperature coefficient (NTC) and positive temperature coefficient (PTC), but any thermistor can be used for the thermosensitive body 11.

An oxide sintered body having a basic composition of manganese oxide ($Mn_3O_4$) having a spinel structure, which is typical for an NTC thermistor, can be used for the thermosensitive body 11. An oxide sintered body having a composition of $M_xMn_{3-x}O_4$ obtained by adding M element (one or more of Ni, Co, Fe, Cu, Al, and Cr) to this basic structure can be used for the thermosensitive body 11. Further, one or more of V, B, Ba, Bi, Ca, La, Sb, Sr, Ti, and Zr can be added.

In addition, a composite oxide having a perovskite structure typical for a PTC thermistor, for example, an oxide sintered body having $YCrO_3$ as a basic structure, can be used for the thermosensitive body 11.

[Electrode 12: FIG. 4]

The electrode 12 is formed as a thick or thin film. The electrode 12 of a thick film is formed by, for example, applying a paste prepared by mixing platinum powder with an organic binder to both front and back surfaces of the sintered thermosensitive body 11, and then drying and sintering same. Also, the electrode 12 of a thin film is formed by vacuum deposition or sputtering.

[Cover 13: FIGS. 1, 3, and 4]

As illustrated in FIGS. 1, 3, and 4, the covering body 13 made of glass seals the thermosensitive body 11 and keeps it airtight, in such a manner that the glass covering body 13 prevents occurrence of chemical and physical changes in the thermosensitive body 11 due to ambient environmental conditions where the temperature sensor 1 is used and mechanically protects the thermosensitive body 11. The covering body 13 made of glass covers front (F) end portions of the conductive wires 17 and 17 in addition to the entirety of the thermosensitive body 11 and seals the conductive wires 17 and 17.

The covering body 13 is made of amorphous glass or crystallized glass. Each of these glasses can be used alone, but an amorphous glass and a crystallized glass can also be mixed and used so as to have a desired coefficient of thermal expansion. Crystallized glass is preferably composed of, for example, silicon oxide, calcium oxide, manganese oxide, and aluminum oxide, and more specifically, the covering body 13 can be composed of $SiO_2$: 30 wt % to 60 wt %, Cao: 10 wt % to 30 wt %, MgO: 5 wt % to 25 wt %, and $Al_2O_3$: 0 wt % to 15 wt %. Further, the covering body 13 may be configured by incorporating an inorganic material powder or the like into glass. Examples of the inorganic material powder added to the glass include metal oxides configuring the thermosensitive body 11, such as aluminum oxide ($Al_2O_3$), magnesium oxide (MgO), yttrium oxide ($Y_2O_3$), chromium oxide ($Cr_2O_3$), and zirconium oxide ($ZrO_2$).

[Support Tube 15: FIGS. 1 and 4]

As illustrated in FIGS. 1 and 4, the support tube 15 supports the rear (B) end portion 13B of the covering body 13 to mechanically reinforce the covering body 13 and improve electrical insulation and mechanical strength.

The support tube 15 is made of sintered fine ceramics such as aluminum oxide ($Al_2O_3$) or silicon nitride ($Si_3N_4$), which has a higher mechanical strength than the covering body 13. The support tube 15 is formed with insertion passages 15A and 15A that run through it along the axial direction (L) and through which the pair of conductive wires 17 and 17 respectively pass. The support tube 15 can be omitted for applications requiring low mechanical strength of the covering body 13.

[Conductive Wires 17 and 17: FIGS. 1, 3, and 4]

The conductive wires 17 and 17 are electrically connected on the front (F) sides to the electrodes 12 and 12 formed on two opposite surfaces of the thermosensitive body 11, as illustrated in FIG. 4. Since the front (F) side of each conductive wire 17 is sealed with the covering body 13, Dumet wires having a coefficient of linear expansion close to that of glass are preferably used. A Dumet wire is a conductive wire made of a clad material in which an alloy containing iron and nickel as main components is used as a conductive core wire, and is surrounded with copper.

As illustrated in FIG. 1, the conductive wires 17 and 17 on the front (F) side are inserted through a first heat-resistant insulator 19, and the conductive wires 17 and 17 on the rear (B) side are inserted through insulating tubes 18 and 18 corresponding to a cylindrical insulator of the present invention. A crimping protective covering 23 is provided on the outside of the insulating tubes 18 and 18 to cover the conductive wires 17 and 17 and the insulating tubes 18 and 18 collectively. In the conductive wire 17, the conductive metal is exposed in an area other than where the insulating tube 18 is provided.

[First Heat-Resistant Insulator 19: FIGS. 1 and 3]

A first area A1 on the front (F) side of the temperature sensor 1 is placed under a higher temperature than a second area A2 further on the rear (B) side than the first area A1 when the temperature sensor 1 measures temperature. Therefore, the first heat-resistant insulator 19 is provided in the first area A1 to ensure electrical insulation between the pair of conductive wires 17 and 17 even at high temperatures.

The first heat-resistant insulator 19 is made of a material that can maintain mechanical structure and electrical insulation performance even in a temperature range to which the first area A1 is exposed, for example, 500° C. The first heat-resistant insulator 19 in the first embodiment is made of, for example, a ceramic material such as aluminum oxide ($Al_2O_3$), silicon nitride ($Si_3N_4$), aluminum nitride (AlN).

As illustrated in FIG. 3, the first heat-resistant insulator 19 consists of a hollow cylindrical member provided with two wire accommodation holes 19A and 19A penetrating in the axial direction (L), and a length in the axial direction (L) is set to be equal to or longer than that of the area exposed to high temperatures, that is, the first area A1. This is because a material used for the insulating tube 18, which will be described below, can be selected with a degree of freedom. A partition wall 19B is provided between the two wire accommodation holes 19A and 19A in the radial direction (R) to electrically separate the conductive wires 17 and 17 from each other. An outer wall 19C is provided around the wire accommodation holes 19A and 19A. Therefore, by providing the wire accommodation holes 19A and 19A in the first heat-resistant insulator 19, the conductive wires 17 and 17 are electrically insulated from each other and the conductive wires 17 and 17 are respectively electrically insulated from the protective tube 25.

The first heat-resistant insulator 19 is arranged in such a manner that the rear (B) end portions of the conductive wires 17 are respectively inserted from front (F) end portions 19D of the wire accommodation holes 19A and 19A, and the end portion 19D is slid to a position where the end portion 19D abuts a rear (B) end portion 15B of the support tube 15 of the sensor element 10.

An example of electrical insulation performance (volume low efficiency (Ω·cm, 500° C.)) of typical ceramic materials that configure the first heat-resistant insulator 19 is shown below.

Aluminum oxide ($Al_2O_3$): $10^{12}$ (Ω·cm, 500° C.)

Silicon nitride ($Si_3N_4$): $10^{11}$ (Ω·cm, 500° C.)

Aluminum nitride (AlN): $10^{7}$ (Ω·cm, 500° C.)

[Insulating Tube 18: FIGS. 1 and 3]

The insulating tubes 18 and 18 are for ensuring insulation between two wires on the rear (B) sides of the conductive wires 17 and 17 and between each of the conductive wires 17 and 17 and the protective tube 25. The conductive wires 17 and 17 are inserted though the insulating tubes 18 and 18, respectively. The insulating tubes 18 and 18 are made of a resin material having electrical insulation, heat resistance, and weather resistance, such as a fluorine resin formed into a tubular shape. The fluorine resin is, for example, polytetrafluoroethylene (PTFE), tetrafluoroethylene/perfluoroalkyl vinyl ether copolymer (PFA), or the like. PTFE has a higher melting point than PFA. Both PTFE and PFA have transparency, and PFA in particular has high transparency.

The insulating tube 18 is not limited to these fluorine resins, and can be constructed using appropriate resin materials regardless of whether they are thermoplastic resins or thermosetting resins. The second area A2 where the insulating tubes 18 and 18 are arranged has a lower temperature than the first area A1, so a material with lower heat resistance than the first heat-resistant insulator 19 can be used as the material of the insulating tubes 18 and 18.

A front (F) end portion 18A of the insulating tube 18 is provided to abut a rear (B) end portion 19E of the first heat-resistant insulator 19, and rear (B) end portions of the inserted conductive wires 17 and 17 respectively extend from rear (B) end portions 18B. The conductive wires 17 and 17 are respectively inserted through the insulating tubes 18 and 18 after the first heat-resistant insulator 19 is attached, and the insulating tubes 18 and 18 are arranged at positions where the front (F) end portions 18A and the rear (B) end portion 19E of the first heat-resistant insulator 19 abut on each other. When the insulating tubes 18 and 18 are arranged in this manner, the rear (B) end portions of the conductive wires 17 are respectively exposed to the outside of the insulating tubes 18 and 18 from the rear (B) end portions 18B.

In the present embodiment, the insulating tube 18 is produced separately from the conductive wire 17, and the conductive wire 17 is inserted through the insulating tube 18. However, the present invention is not limited to this. Instead of using the conductive wire 17 and the insulating tube 18 which are separately produced, a so-called covered wire which is produced integrally with the conductive wire 17 may be used.

Figure 2:
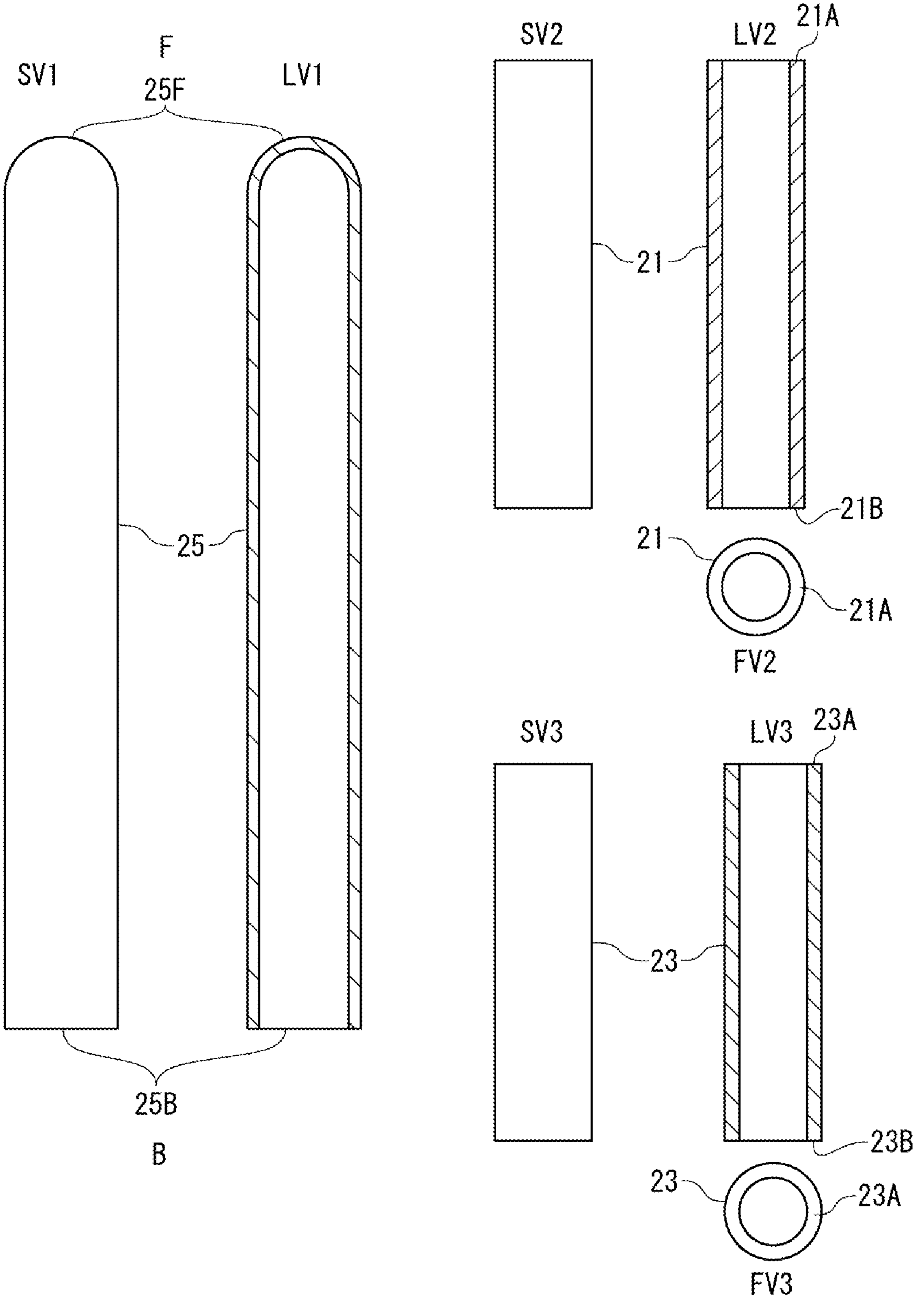
FIG. 2 illustrates a component of the temperature sensor of FIG. 1, including: a side view (SV1) and a cross-sectional view (LV1) each illustrating a protective tube made of metal; a side view (SV2), a longitudinal cross-sectional view (LV2) and a front view (FV2) each illustrating a second heat-resistant insulator; and a side view (SV3), a longitudinal cross-sectional view (LV3) and a front view (FV3) each illustrating crimping protective covering.

[Second Heat-Resistant Insulator 21: FIGS. 1 and 2]

A second heat-resistant insulator 21 is provided between the first heat-resistant insulator 19 and the protective tube 25 and performs electrical insulation between the conductive wires 17 and 17 accommodated in the first heat-resistant insulator 19 and the protective tube 25.

The second heat-resistant insulator 21 is made of the same ceramic material as the first heat-resistant insulator 19 and has a cylindrical shape. The second heat-resistant insulator 21 has, for example, an outer diameter substantially equal to an inner diameter of the protective tube 25 and an inner diameter large enough to accommodate the first heat-resistant insulator 19 therein. As illustrated in FIG. 1, a front (F) end portion 21A of the second heat-resistant insulator 21 is fitted to the outside of the support tube 15 in the radial direction (R).

A dimension in the length direction L of the second heat-resistant insulator 21 is larger than a dimension in the length direction L of the first heat-resistant insulator 19, and the dimension in the length direction L of the second heat-resistant insulator 21 is set to a length such that when the second heat-resistant insulator 21 is accommodated in the protective tube 25, a rear (B) end portion 21B is located further on the front (F) side than an attachment position 27A where a fixing flange 27, which will be described below, is provided. By setting the dimension in the length direction L of the second heat-resistant insulator 21 in this way, a part of the front (F) sides of the insulating tubes 18 and 18 is accommodated inside the second heat-resistant insulator 21, so that electrical insulation between the conductive wires 17 and 17 and the protective tube 25 can be further enhanced.

[Crimping Protective Covering 23: FIGS. 1 and 2]

The sensor element 10 is accommodated in the protective tube 25, as illustrated in FIG. 1. The sensor element 10 is fixed to the protective tube 25 by crimping an outer peripheral surface of the protective tube 25 toward its center. When this fixation by crimping is performed at a position where the protective tube 25 and the second heat-resistant insulator 21 overlap, the second heat-resistant insulator 21 may be damaged. Therefore, crimping is performed at the rear (B) side of a position of the end portion 21B of the second heat-resistant insulator 21, that is, at a position where the protective tube 25 and the insulating tube 18 overlap. Thus, the crimping protective covering 23 is provided between the insulating tube 18 and the protective tube 25 to prevent the insulating tubes 18 and 18 and the conductive wires 17 and 17 from being damaged even when the crimping force is directly applied to the insulating tubes 18 and 18.

As illustrated in FIG. 1, by providing the crimping protective covering 23 between outer peripheral surfaces of the insulating tubes 18 and 18 and an inner peripheral surface of the protective tube 25, only indirect force is applied to the conductive wires 17 and 17 via the crimping protective covering 23. Therefore, damage to the insulating tubes 18 and 18 can be prevented.

As an example, the crimping protective covering 23 is formed by forming a heat-resistant cloth such as glass cloth, silica cloth (silicate cloth), or alumina cloth into a tubular shape, into which the conductive wires 17 and 17 inserted through the insulating tubes 18, 18 are inserted. Glass cloth is a fabric of inorganic fibers made of glass, silica cloth is a fabric of inorganic fibers mainly composed of silicon oxide ($SiO_2$), and alumina cloth is a fabric of inorganic fibers mainly composed of aluminum oxide ($Al_2O_3$).

In the crimping protective covering 23, the insulating tubes 18 and 18 are inserted through such that a front (F) end portion 23A of the crimping protective covering 23 abuts the end portion 21B of the second heat-resistant insulator 21, and a rear (B) end portion 23B of the crimping protective covering 23 is exposed from the protective tube 25. A dimension in the length direction L of the crimping protective covering 23 is set to a length such that a part of the rear (B) of the conductive wires 17 and 17 and a part of the rear (B) of the insulating tubes 18 and 18 are exposed from the crimping protective covering 23 toward the rear (B). Crimping takes place in an area provided with the crimping protective covering 23 and covered by the protective tube 25. A specific crimping method will be referred to in the description of the protective tube 25 below.

[Protective Tube 25: FIGS. 1 and 2]

The protective tube 25 is provided to hold the sensor element 10 and protect the sensor element 10 from vibration, external force, high heat, and combustion gas from the outside of the protective tube 25.

As illustrated in FIGS. 1 and 2, the protective tube 25 is formed in a dome shape with a closed front (F) end portion 25F accommodating the thermosensitive body 11, and a rear (B) end portion 25B is formed in a cylindrical shape with an opening for drawing out the conductive wires 17 and 17.

The protective tube 25 is constructed from stainless steel, Ni-based superalloys, and other heat resistant alloys. These alloys contain large amounts of Ni and Cr in order to ensure heat resistance. For example, JIS NCF600, which is an example of a Ni-based superalloy, contains about 75 wt % of Ni and about 16 wt % of Cr.

The protective tube 25 is placed inside a heating chamber 44 of a heating cooker in which the temperature sensor 1 is used, for example, a convection microwave oven 40 to be described below, so that the protective tube 25 is exposed to an oxidizing atmosphere during use of the oven. Therefore, a surface of the protective tube 25 is oxidized with use of the oven. Such changes in properties of the protective tube 25 can cause errors in detection of temperature. Further, when the protective tube 25 is oxidized, the inside of the protective tube 25 is brought into a reduced state, at which point the thermosensitive body 11 comprised of oxide is deprived of oxygen $O_2$, thereby causing a compositional deviation in the thermosensitive body 11. As a result, characteristics of the thermosensitive body 11 change, which may cause errors in detection of temperature. Therefore, the surface of the protective tube 25 is preferably oxidized in advance. Furthermore, an outer surface of this protective tube 25 is preferably black in order to improve heat collection. However, the outer surface of the protective tube 25 in the present embodiment can exhibit colors other than black. For example, in a case where the protective tube 25 protrudes into the heating chamber 44, the outer surface of the protective tube 25 and a wall surface of the heating chamber 44 can be colored similarly, resulting in that the protective tube 25 is less visible inside the heating chamber 44.

In order to make the outer surface black for the protective tube 25, a heat-resistant paint based on silicon resin that exhibits a black color, for example, can be applied in advance. The heat-resistant paint based on silicon resin has a heat resistance of 600° C. The heat-resistant paint based on silicon resin includes organic silicon compounds obtained by bonding silica ($SiO_2$/silicon oxide) and organic substances (compounds mainly composed of carbon), and polymerizing them. Since the bonding strength of (Si—O) bonds in silicone resins is considerably stronger than that of (C—C) bonds in organic resins, it has a high heat resistance. For example, by adding a black pigment such as graphite or carbon black, a heat-resistant paint based on silicon resin that exhibits a black color can be obtained. The black color is preferably matte.

In addition, in a case where the protective tube 25 is made of a Fe-based metal material, the outer surface of the protective tube 25 can be made black through a process known as black rust treatment. Usually, an inner surface of the protective tube 25 is also made black through the black rust process.

Figure 7:
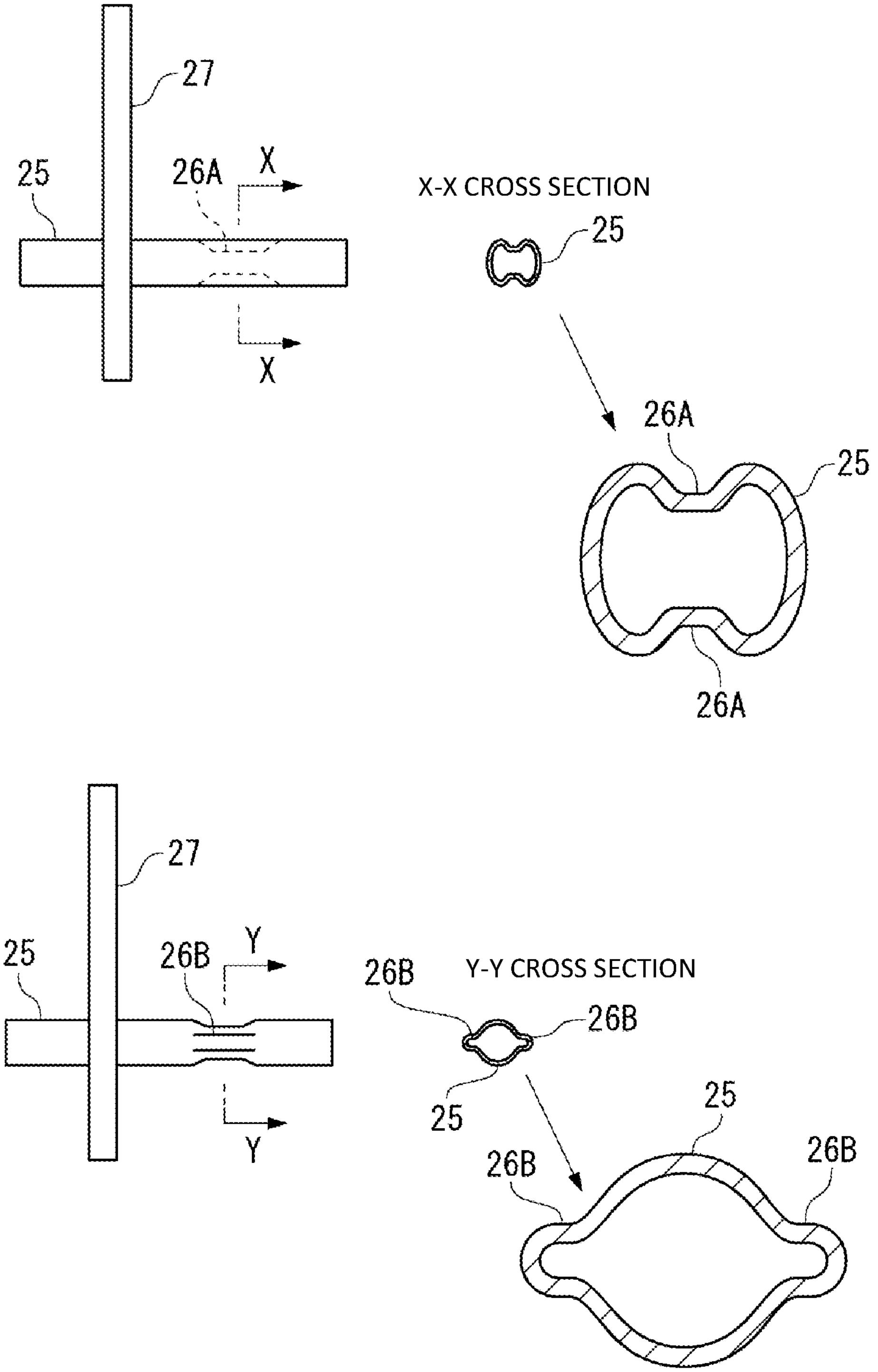
FIG. 7 is a diagram illustrating crimping processing according to the present embodiment.

Although the protective tube 25 illustrated in FIG. 1 shows a state before crimping, crimping may be employed in various forms. Two main examples are illustrated in FIG. 7. The upper diagram in FIG. 7 illustrates the form of crimpings 26A and 26A obtained by pressing a pair of convex crimping pieces (not illustrated) against the protective tube 25. In this form, the insulating tubes 18 and 18 (conductive wires 17 and 17) (not illustrated) are mechanically fixed to the protective tube 25 via the crimping protective covering 23 by forming dents on two opposite sides of the protective tube 25 by plastic deformation. The lower diagram in FIG. 7 illustrates the form of crimpings 26B and 26B obtained by pressing a pair of concave crimping pieces (not illustrated) against the protective tube 25. In this form, the insulating tubes 18 and 18 (conductive wires 17 and 17) (not illustrated) are mechanically fixed to the protective tube 25 via the crimping protective covering 23 by forming convexities on two opposite sides of the protective tube 25 by plastic deformation.

The fixing flange 27 is attached to the protective tube 25 for fixing the temperature sensor 1 to a temperature measurement target object, such as an oven. The fixing flange 27 is formed extending in the radial direction R of the protective tube 25. When the temperature sensor 1 is attached to the oven via the fixing flange 27, a portion further on the front (F) side than the attachment position 27A of the fixing flange 27, that is, the first area A1 of the protective tube 25, is arranged to protrude into the heating chamber subject to high temperature, and a portion further on the rear (B) side than the first area, that is, a portion further on the rear (B) side than the attachment position 27A of the fixing flange 27, is arranged outside the heating chamber. Although FIG. 7 illustrates an example of crimping on a portion further on the rear (B) side than the attachment position 27A of the fixing flange 27, the crimping position is not limited to these examples. The crimping position may be located at an area further on the rear side (B) than the first area subject to high temperature, that is, an area further on the front side (F) than the fixing flange 27 if the area is lower in temperature than the first area. Since the portion of the temperature sensor 1 further on the rear (B) side than the fixing flange 27 is located outside the heating chamber of the oven, the crimping is not exposed to high temperatures, and thus there is no possibility that the crimping will be loosened due to a rise in temperature.

[Effects of Temperature Sensor 1]

The temperature sensor 1 according to the first embodiment further includes the second heat-resistant insulator 21 in addition to the first heat-resistant insulator 19 for electrically insulating the conductive wires 17 and 17 from each other. By shielding a conductive path between the conductive wires 17 and 17 and the protective tube 25 with the second heat-resistant insulator 21, electrical insulation can be more reliably ensured even under usage environments that require a particularly high voltage withstand between the conductive wires 17 and 17 and the protective tube 25.

Figure 5:
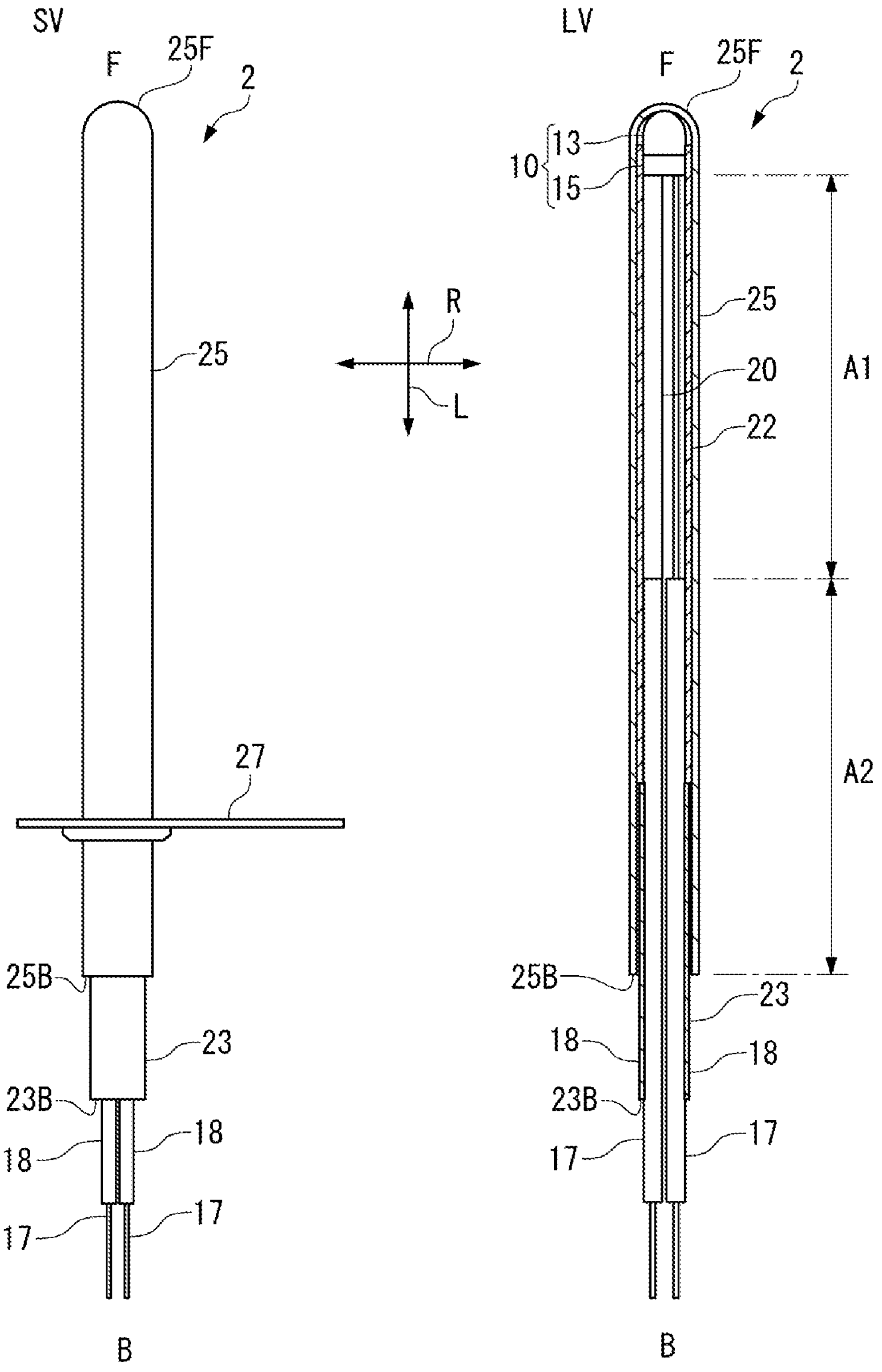
FIG. 5 is a side view (SV) and a longitudinal cross-sectional view (LV) each illustrating a temperature sensor according to a second embodiment of the present invention.
Figure 6:
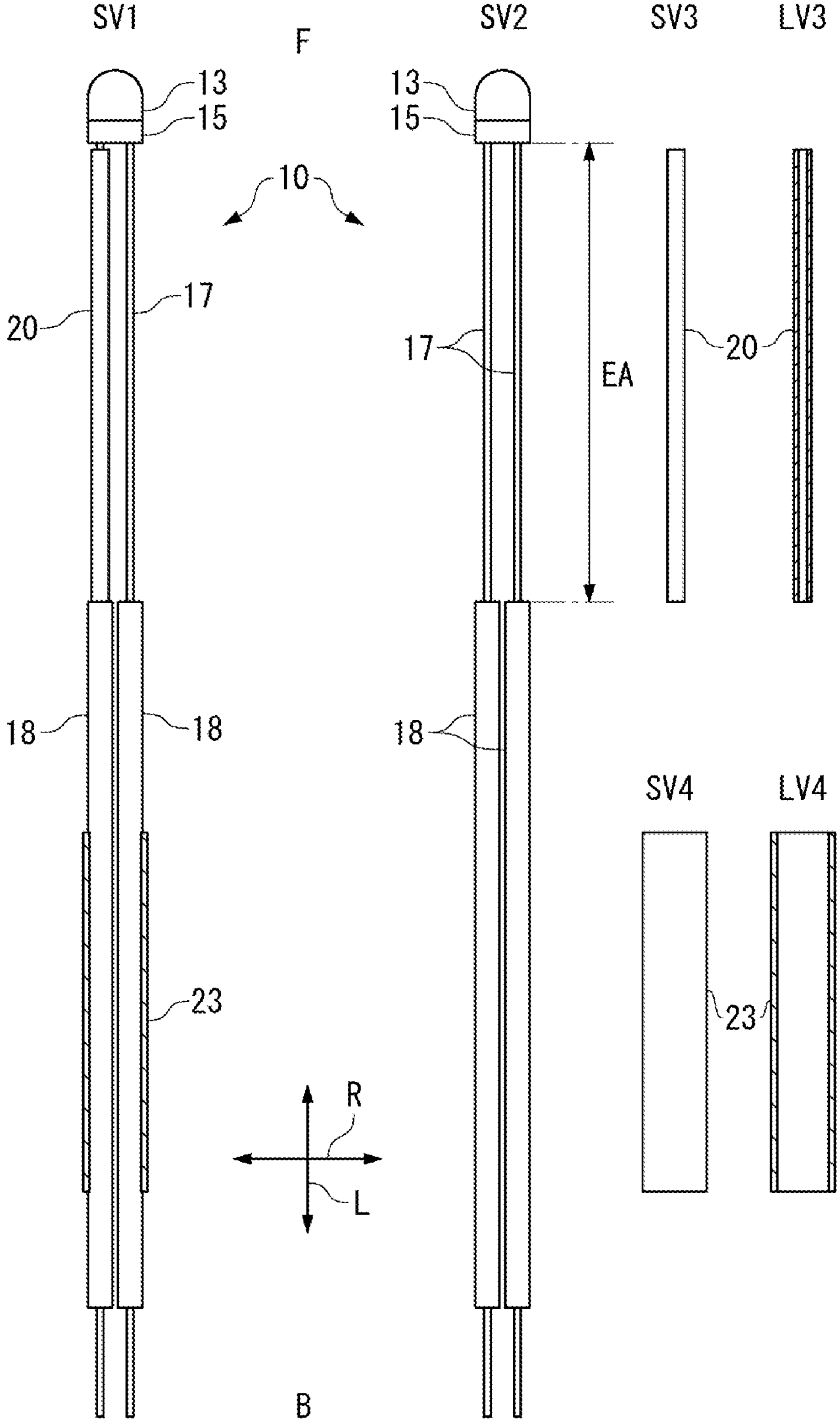
FIG. 6 illustrates a sensor element of the temperature sensor of FIG. 5, including: a side view (SV1) illustrating a state in which a first heat-resistant insulator and a crimping protective covering are assembled; a side view (SV2) in which the first heat-resistant insulator and the crimping protective covering are separated; a side view (SV3) and a longitudinal cross-sectional view (LV3) of the first heat-resistant insulator; and a side view (SV4) and a longitudinal cross-sectional view (LV4) of the crimping protective covering.

Second Embodiment: FIGS. 5 and 6

Next, a temperature sensor 2 according to a second embodiment of the present invention will be described with reference to FIGS. 5 and 6. The main difference between the temperature sensor 2 and the temperature sensor 1 according to the first embodiment lies in the first heat-resistant insulator 19 and a first heat-resistant insulator 20 for electrically insulating the conductive wires 17 and 17 from each other, and the second heat-resistant insulator 21 and a second heat-resistant insulator 22. In the following, the temperature sensor 2 will be described with a focus on this point of difference, and similar components as those of the temperature sensor 1 will be assigned the same reference numerals as those of the temperature sensor 1, and their description will be omitted.

First, as illustrated in FIGS. 5 and 6, the first heat-resistant insulator 20 according to the second embodiment exemplifies a case where only one of the two conductive wires 17 and 17 is covered. The first heat-resistant insulator 20 is made of a material that can maintain mechanical structure and electrical insulation performance even in a temperature range to which the first area A1 is exposed. Examples of this material are heat-resistant cloths such as glass cloth, silica cloth (silicate cloth), and alumina cloth described above. This heat-resistant cloth is formed into a tubular shape, and the conductive wire 17 is inserted thereinto such that the heat-resistant close covers substantially the entirety of the first area A1 of one conductive wire 17. This arrangement ensures the electrical insulation performance between the pair of conductive wires 17 and 17 while maintaining heat resistance. In order to ensure sufficient insulation even under higher voltage and higher temperature, it is possible to prepare a pair of first heat-resistant insulators 20 and 20 to cover each of the conductive wires 17 and 17.

Next, the second heat-resistant insulator 22 is the same as the second heat-resistant insulator 21 of the first embodiment in that a cylindrical insulating member having the same diameter from the front (F) end portion to the rear (B) end portion is used, with the difference being that a member made of glass is used as the material for the second heat-resistant insulator 22. The main reason for selecting glass as the material for the second heat-resistant insulator 22 is as follows.

Compared to the ceramic material used to form the second heat-resistant insulator 21 in the first embodiment, a cylindrical member made of glass has high accuracy in the dimensions and shapes because warpage can be reduced even if the cylindrical member is long in length. The second heat-resistant insulator 22 is accommodated inside the protective tube 25. The protective tube 25 has high accuracy in the dimensions and shapes, because it is made of metal material, even if it is long in length. Therefore, the second heat-resistant insulator 22 accommodated inside the long protective tube 25 is also required to have high accuracy in the dimensions and shapes. Therefore, in the second embodiment, the second heat-resistant insulator 22 made of glass is used. The reason why the warpage of the ceramic member tends to increase while the warpage of the glass member can be reduced will be briefly described below.

A ceramic member is produced by sintering a compact obtained by compacting raw material particles. When the compact is heated to a high temperature for sintering, the raw material particles bond with each other, gaps between the particles become small, and the compact shrinks to form a sintered body. During a sintering process, variations in the degree of shrinkage can occur. This variation, or uneven shrinkage, causes warpage. It can be easily anticipated that the degree of warpage increase as the length of the cylindrical member increases and as the diameter of the cylindrical member decreases. In some case it may not be practical to correct warpage of the sintered body after sintering. For example, although warpage can be corrected through methods such as cylindrical grinding, the inclusion of additional processes results in a significant increase in man-hours and cost.

A member made of glass can be produced by melting a raw material and extruding the melted material. While this extruded molding body may also warp, the warpage can be corrected during a cooling process. As a result, even for a long glass member, warpage can be reduced.

Figure 8:
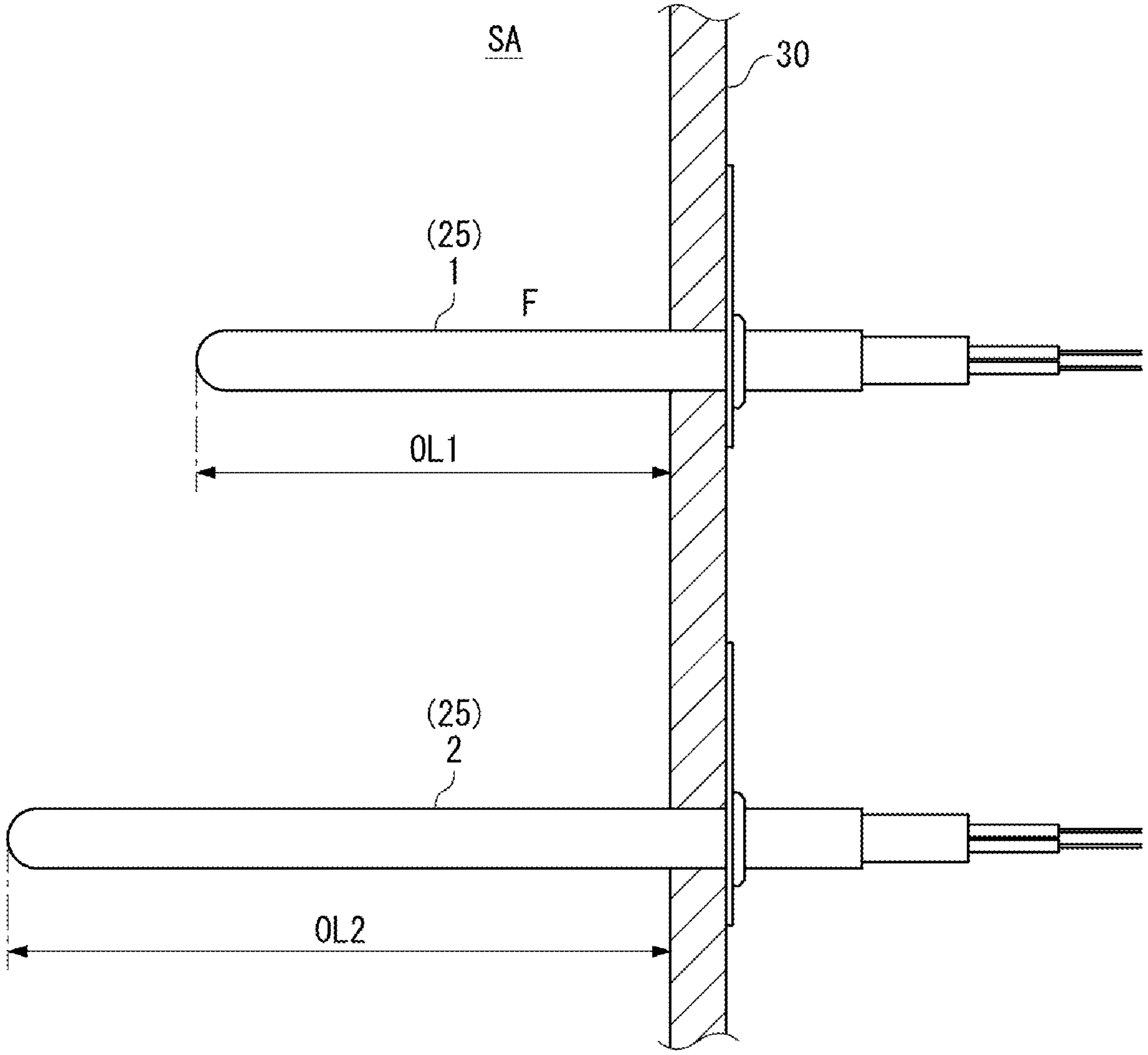
FIG. 8 is a side view illustrating a state in which the temperature sensor according to the present embodiment is attached to a measurement target object.

FIG. 8 illustrates the temperature sensor 1 (first embodiment) having the second heat-resistant insulator 21 made of a ceramic member and the temperature sensor 2 (second embodiment) having the second heat-resistant insulator 22 made of a glass member attached to a holding wall 30. When a dimension of the temperature sensor 2 protruding into a heating area SA inside (left side in the drawing) the holding wall 30 is set as OL2, and a dimension of the temperature sensor 1 is set as OL1, a relationship of OL2>OL1 is satisfied, and the temperature sensor 2 can accurately measure the temperature at a position farther from the holding wall 30 in the heating area SA.

Examples of dimensions of the first heat-resistant insulator 19, the second heat-resistant insulator 21 made of a ceramic member, and the second heat-resistant insulator 22 made of a glass member are described below.

First heat-resistant insulator 19 (ceramics):

Inner diameter (wire accommodation hole); 0.6 mm, outer diameter; 2.0 mm, length; 12 mm Second heat-resistant insulator 21 (ceramics):

Inner diameter; 2.5 mm, outer diameter; 3.0 mm, length; 20 mm

Second heat-resistant insulator 22 (glass):

Inner diameter; 2.5 mm, outer diameter; 3.0 mm, length; 80 mm

Next, an example of the electrical insulation performance (volume resistivity (Ω·cm)) of typical glass composing the second heat-resistant insulator 22 is shown below. Glass has an electrical insulation performance equivalent to that of the ceramic material described above.

Soda-lime glass: about $10^{12}$ (Q·cm, 150° C.), about $10^{9}$ (Ω·cm, 250° C.)

[Effects of Temperature Sensor 2]

In addition to the effects of the temperature sensor 1, the temperature sensor 2 according to the second embodiment has the following effects.

Since the second heat-resistant insulator 22 of the temperature sensor 2 is composed of a cylindrical glass member having electrical insulation performance equivalent to that of ceramics, the second heat-resistant insulator 22 can be made long. Therefore, even when the dimension of the temperature sensor 2 that protrudes into a target space for temperature measurement is long, the temperature sensor 2 can be manufactured with a dimension corresponding to it.

Moreover, since the glass material has high moisture absorption resistance, deterioration of electrical insulation performance can be reduced even when the temperature sensor 2 is used continuously. Also, when the second heat-resistant insulator 22 is made of a transparent glass material, it is easy to visually inspect the inside of the temperature sensor 2 during a production process, which is preferable for production management.

Next, in the temperature sensor 2, the conductive wires 17 and 17 are electrically insulated from each other by covering only one of the conductive wires 17 and 17 with the first heat-resistant insulator 20. Further, this first heat-resistant insulator 20 is formed by forming a heat-resistant cloth into a tubular shape. Therefore, the man-hours and cost spent on the second heat-resistant insulator 20 in the temperature sensor 2 can be reduced.

Figure 9:
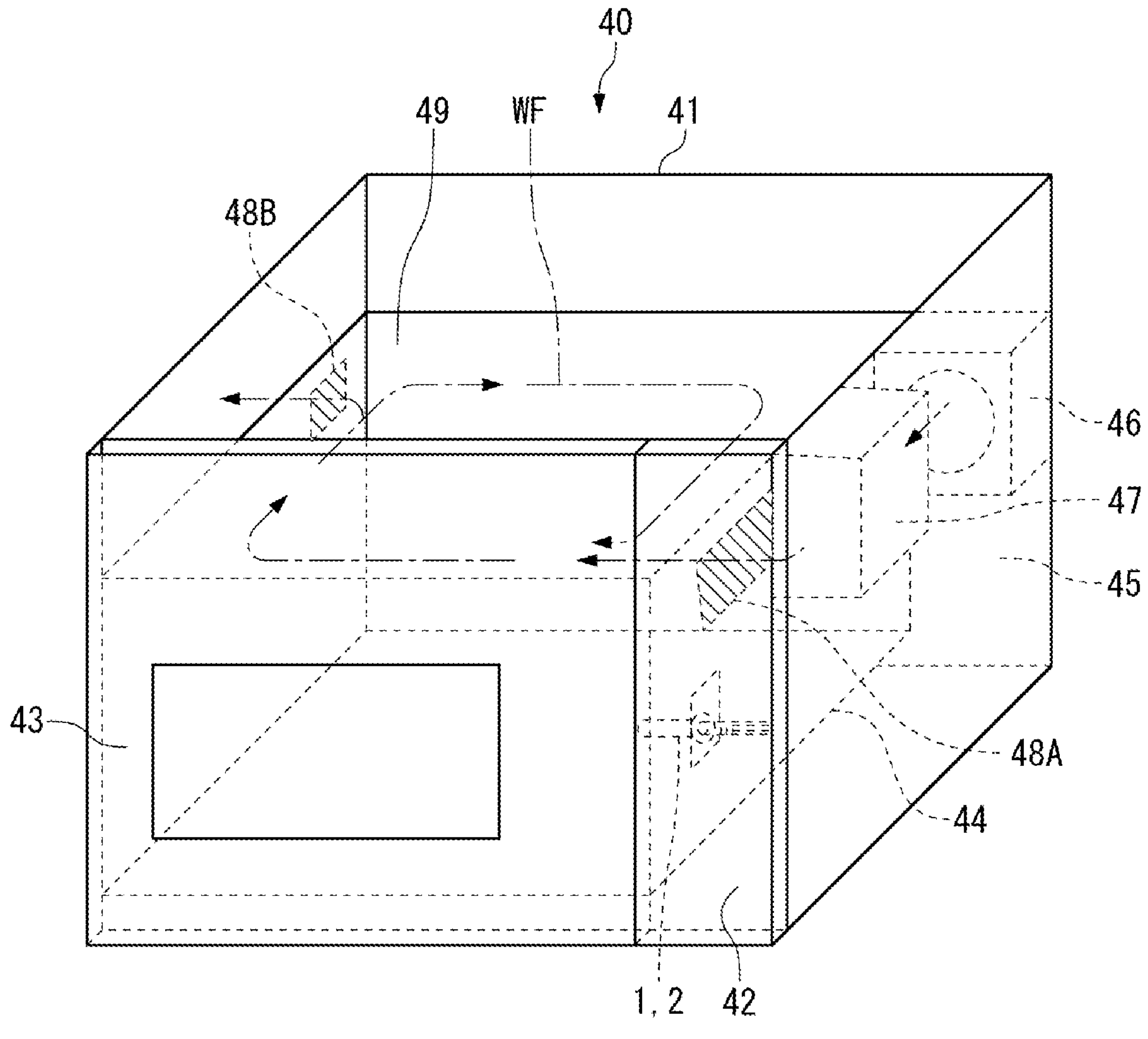
FIG. 9 is a diagram illustrating an example of a heating cooker according to the present embodiment.

[Illustration of Heating Cooker (Convection Microwave Oven): FIG. 9]

An example of the convection microwave oven 40 as a heating cooker to which the temperature sensor 1 or 2 described above is applied will be described with reference to FIG. 9.

The convection microwave oven 40 includes an outer casing 41 having a square shape, a control panel 42 provided with various operation buttons (not illustrated) on a front surface of the outer casing 41, and a door 43 provided on the side of the control panel 42 and attached to the outer casing 41 by a hinge so as to be freely opened and closed. In addition, inside the outer casing 41, the heating chamber 44 is provided corresponding to a portion of the door 43, and an opening of the heating chamber 44 appears when the door 43 is opened. Also, a space 45 separate from the inside of the heating chamber 44 is provided behind the control panel 42.

A blower fan 46 is provided inside the space 45. The blower fan 64 takes air from the outside of the outer casing 41 into the space 45 and sends the air into the heating chamber 44 from a ventilation hole 48A provided in a side wall of the heating chamber 44 facing the space 45, and then discharges the air to the outside of the outer casing 41 from another ventilation hole 48B provided on an opposite side surface so as to pass through the heating chamber 44 and the outer casing 41. As a result, an air flow WF is formed so as to circulate inside the heating chamber 44.

A microwave generator 47 is attached to a side surface of the heating chamber 44 inside the space 45. By radiating microwaves into the heating chamber 44 from a magnetron (not illustrated) provided inside the microwave generator 47, an object to be heated on a turntable (not illustrated) provided at the bottom of the heating chamber 44 can be heated by microwaves.

A heater (not illustrated) is provided on a back surface of a ceiling plate 49 of the heating chamber 44 to heat the ceiling or the air inside the heating chamber 44 to raise the atmospheric temperature in the heating chamber 44. Further, the temperature sensor 1 or 2 is attached to a side wall of the heating chamber 44 facing the space 45. The temperature sensor 1 or 2 is attached so as to protrude into the heating chamber 44 through the side wall.

In recent years, the convection microwave oven 40 with the heating chamber 44 having a larger volume is demanded. In order to measure the temperature more accurately inside the heating chamber 44 having such a large volume, it is preferable to measure the temperature near a center of the heating chamber 44 as much as possible. However, the conventional temperature sensors have been unable to provide a sufficient length to measure the temperature near the center of the heating chamber.

As described above with reference to FIG. 8, the temperature sensor 2 having the second heat-resistant insulator 22 made of a glass member can increase the dimension (OL2) of the temperature sensor 2 protruding into the heating area SA. Therefore, for the convection microwave oven 40 having the heating chamber 44 with a larger volume, it is preferable to apply the temperature sensor 2 in which the second heat-resistant insulator 22 is composed of a glass member. On the other hand, for the heating chamber 44 with a small volume, the temperature sensor 1 in which the second heat-resistant insulator 21 is composed of a ceramic member can be used.

In addition to the above, it is possible to select the configurations described in the above-described embodiments or to change them to other configurations as appropriate without departing from the gist of the present invention.

For example, the first heat-resistant insulator 19 of the first embodiment and the first heat-resistant insulator 20 of the second embodiment can be replaced with each other.

REFERENCE SIGNS LIST

1, 2 Temperature sensor
10 Sensor element
11 Thermosensitive body
12 Electrode
13 Covering body
15 Support tube
15A, 15A Insertion passage
17 Conductive wire
18 Insulating tube
19, 20 First heat-resistant insulator
19A Wire accommodation hole
19B Partition wall
19C Outer wall
21, 22 Second heat-resistant insulator
23 Crimping protective covering
25 Protective tube
27 Fixing flange
30 Holding wall
40 Convection microwave oven
44 Heating chamber
A1 First area
A2 Second area

The invention claimed is:

1. A temperature sensor, comprising:
a protective tube made of metal;
a sensor element including a thermosensitive body and a pair of conductive wires electrically connected to the thermosensitive body and accommodated in the protective tube;
a first heat-resistant insulator that electrically insulates the pair of conductive wires inside the protective tube; and
a cylindrical second heat-resistant insulator made of solid glass and provided between the first heat-resistant insulator and the protective tube that electrically insulates the protective tube from the pair of conductive wires, wherein
the sensor element further includes:
a covering body covering a periphery of the thermosensitive body; and
a support tube joined to an end portion of the covering body and having a higher mechanical strength than the covering body, and
an end portion of the cylindrical second heat-resistant insulator is fitted to an outside of the support tube in a radial direction of the cylindrical second heat-resistant insulator.

2. The temperature sensor according to claim 1, wherein each of the pair of conductive wires is independently inserted through the first heat-resistant insulator.

3. The temperature sensor according to claim 1, wherein only one of the pair of conductive wires is inserted through the first heat-resistant insulator.

4. The temperature sensor according to claim 1, further comprising:
a pair of cylindrical insulators comprising an electrically insulating material that electrically insulates the pair of conductive wires, wherein
the pair of conductive wires is inserted through the first heat-resistant insulator in a first area which is an area on a side of an end portion of the protective tube having the end portion which is closed at a front, and is respectively inserted through the pair of cylindrical insulators in a second area at a rear of the first area.

5. The temperature sensor according to claim 4, wherein the cylindrical second heat-resistant insulator straddles the pair of cylindrical insulators covering the pair of conductive wires on a rear side.

6. The temperature sensor according to claim 5, wherein the pair of conductive wires is mechanically fixed to the protective tube by crimping through a crimping protective covering in an area of the pair of conductive wires where the pair of cylindrical insulators is provided.

7. The temperature sensor according to claim 4, wherein:
the protective tube further includes a flange that extends in a direction intersecting a length direction of the protective tube; and
a dimension of the cylindrical second heat-resistant insulator in the length direction is set equal to or less than a dimension in the length direction from the end portion of the protective tube to a position where the flange is provided.

8. The temperature sensor according to claim 7, wherein:
the pair of conductive wires is mechanically fixed to the protective tube by crimping through a crimping protective covering in an area of the pair of conductive wires where the pair of cylindrical insulators is provided; and
the crimping is applied at a rear of the position where the flange of the protective tube is provided.

9. The temperature sensor according to claim 8, wherein an outer surface of the protective tube is black.

10. A heating cooker in which the temperature sensor according to claim 1 is arranged in a heating chamber.

* * * * *